United States Patent
Leister

(10) Patent No.: US 8,351,103 B2
(45) Date of Patent: Jan. 8, 2013

(54) METHOD AND DEVICE FOR REDUCING SPECKLE

(75) Inventor: Norbert Leister, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 361 days.

(21) Appl. No.: 12/520,165

(22) PCT Filed: Dec. 13, 2007

(86) PCT No.: PCT/EP2007/063862
§ 371 (c)(1),
(2), (4) Date: Nov. 24, 2009

(87) PCT Pub. No.: WO2008/074721
PCT Pub. Date: Jun. 26, 2008

(65) Prior Publication Data
US 2010/0097672 A1    Apr. 22, 2010

(30) Foreign Application Priority Data

Dec. 19, 2006  (DE) .......................... 10 2006 062 377

(51) Int. Cl.
*G03H 1/00*        (2006.01)
(52) U.S. Cl. ............................................ 359/32; 359/34
(58) Field of Classification Search .................... 359/10, 359/11, 32, 34, 35
See application file for complete search history.

(56) References Cited

U.S. PATENT DOCUMENTS

| | | | |
|---|---|---|---|
| 5,644,414 A * | 7/1997 | Kato et al. | 359/22 |
| 2007/0081207 A1* | 4/2007 | Bimber | 359/9 |

FOREIGN PATENT DOCUMENTS

| | | |
|---|---|---|
| CA | 959682 | 12/1974 |
| DE | 195 41 071 | 5/1997 |
| DE | 103 53 439 | 6/2004 |
| GB | 2 350 963 | 12/2000 |
| WO | WO 2006/119920 | 11/2006 |

OTHER PUBLICATIONS

Shin et al., Applied Optics, OSA, Optical Society of America, vol. 41, No. 14, pp. 2644-2649 (May 10, 2002) XP002302775.
International Search Report, dated May 7, 2008, issued in priority International Application No. PCT/EP2007/063862.

* cited by examiner

*Primary Examiner* — Jennifer L. Doak
(74) *Attorney, Agent, or Firm* — Saul Ewing LLP

(57) ABSTRACT

A method for reducing speckle patterns of a three-dimensional holographic reconstruction is disclosed. A controllable light modulator into which a three-dimensional scene is coded is illuminated by coherent light, a reconstruction means projects the modulated light close to an eye position into a space of observation and a control means controls the illumination. This provides a holographic reproduction device in which the speckle patterns occurring during reconstruction of a three-dimensional scene are reduced. Also provided is a next-to-real time method using a carrier medium of conventional image refresh rate.

18 Claims, 4 Drawing Sheets

METHOD AND DEVICE FOR REDUCING SPECKLE

CROSS REFERENCE TO RELATED APPLICATIONS

This application claims the priority of PCT/EP2007/063862, filed on Dec. 13, 2007, which claims priority to German Application No. 10 2006 062 377.0, filed Dec. 19, 2006, the entire contents of which are hereby incorporated in total by reference.

FIELD OF THE INVENTION

The present invention relates to a method for reducing speckle patterns of a three-dimensional holographic reconstruction of a three-dimensional scene, and to a holographic reproduction device used to implement that method.

This invention can be applied in conjunction with methods which allow complex wave fronts of a three-dimensional scene (3D scene) to be recorded and reconstructed with the help of holography, preferably using laser light in real-time or in near-realtime in holographic reproduction devices, where the reconstruction can be seen from a virtual observer window.

BACKGROUND OF THE INVENTION

Holography allows a three-dimensional object or a moving 3D scene to be recorded and optically reproduced using wave-optical methods. The 3D scene is encoded on a light modulator which serves as a carrier medium. Due to the illumination with light waves which are capable of generating interference, each point of the encoded 3D scene forms a point of origin of light waves interfering with each other and which, as a resultant light wave front, spatially reconstruct the 3D scene as if it was generated by light propagating from a real object in space. The holographic reconstruction of the object or the 3D scene is preferably realised with the help of a projection device and/or an optical reconstruction system by illuminating a carrier medium with normally sufficiently coherent light.

In this document, the 3D scene is reconstructed in a holographic reproduction device with an observer window, which is a viewing zone in an observer region. The size of the observer window in front of a display means is defined; it is typically as large as an eye pupil. This is why it is referred to as the eye position, in which an observer eye can be situated, and from which the observer can see the reconstruction of the 3D scene.

Seen from the wave-optical point of view, an observer window is formed either by a direct or an inverse Fourier transform or Fresnel transform of a hologram encoded on a carrier medium, or by the imaging of a wave front encoded on a carrier medium in a plane of an observer region, where the observer window comprises only one diffraction order of a periodical reconstruction. The plane may be a focal plane of a focusing means or the image plane of a light source. The hologram or the wave front are computed from the 3D scene such that, within the one diffraction order which is used as the viewing zone, cross talk between the observer eyes is prevented, which would typically occur in reconstructions when using light modulators. In conjunction with an arrangement or a method for suppressing higher diffraction orders, 3D scenes can be consecutively presented in multiplex process to a left and to a right eye of an observer without any cross talk. Moreover, a multiplex process with the aim to serve multiple persons only becomes possible then.

Carrier or recording media for holograms and complex wave fronts of a 3D scene include spatial light modulators, such as LCD, LCoS etc., which modulate the phase and/or amplitude of incident light. The refresh rate of the carrier medium must be sufficiently high in order to be able to represent moving 3D scenes.

The values which are encoded into regularly arranged pixels on the carrier medium can be originated from a real object or be a computer-generated hologram (CGH).

The observer can view the reconstruction of the 3D scene by looking directly on to the carrier medium. In this document, this arrangement is referred to as direct-view display. Alternatively, the observer can look on to a screen on to which either an image or a transform of the values encoded on the carrier medium is projected. In this document, this arrangement is referred to as projection display.

Both the screen in the projection display and the carrier medium in the direct-view display are meant by the term 'screen' below hologram is because of the effects of diffraction only possible within one periodicity interval of the reconstruction of a wave front, said periodicity interval being defined by the resolution of the carrier medium. The reconstruction is typically repeated showing irregularities in adjacent periodicity intervals.

Disturbing patterns, which are also known as speckle patterns or granulation, occur when using coherent laser light for illuminating a light modulator. Speckle can be described as a granulation-like interference pattern which is created by interference of multiple light waves with statistically irregularly distributed phase differences.

The reconstruction of a hologram is adversely affected by the speckle patterns. The 3D scene is typically discretely scanned for hologram computation, because it can only be recorded discretely on the carrier medium. Certain encoding methods, where information of the 3D scene is recorded in a suitable manner on the carrier medium, generally make possible a reconstruction where the reconstruction is fully identical to the scanned object at the positions of the scan points. The physical reconstruction results in a continuous gradient, also between the scan points. Deviations from the light intensity gradient in the object occur between the scan points, so that the reconstruction contains speckle patterns, which reduce the quality of the reconstruction. This is in particular the case when computing the hologram with a random phase of the object points, which is, however, advantageous for certain other reasons.

Reducing the speckle patterns in the reconstruction of the 3D scene can be realized by temporal or/and spatial averaging, where the reconstruction is generated from values of a 3D scene encoded on an external carrier medium or from hologram values which are computed in another suitable way. The eye of the observer always averages multiple reconstructions presented to him with different speckle patterns, resulting in a perceivable reduction of this disturbance.

In document DE 195 41 071 A1, for example, a rotating rectangular glass plate is put into the optical path for a time average of the granulation when checking a hologram. The speckles do not appear disturbing anymore because the glass plate rotates at a frequency which is adapted to that of a detector. However, such a method can only be applied for reducing a two-dimensional, plane speckle pattern, where the diffusing screen must be disposed in the plane of the speckle pattern.

A known method of time averaging in order to reduce speckle patterns of a 3D scene is that the 3D scene is to compute with a given number of different random phases, and to represent the respective holograms on a carrier medium one after another at a fast pace. Due to the multiple hologram computations, the computational load increases considerably and the refresh rate of the carrier medium would also have to increase significantly when representing the holograms, which is undesired.

As regards spatial averaging, it is generally known from the literature to divide a carrier medium into multiple independent regions, where repetitions of subholograms which are computed from the same object, but with different object phases, are written next to each other and/or below each other. The eye of the observer averages different speckle patterns of the individual reconstructions of the computed sub-holograms generated with a Fourier transformation or Fresnel transformation, so that the resulting speckle pattern appears weakened.

However, this method cannot be applied to a holographic display with an observer window, as described by the applicant in document DE 103 53 439 A1 and on which this document is based. A complex-valued light distribution of the diffraction image of an object, e.g. a 3D scene, is computed in the observer window of an observer plane. Transformations of individual object planes, into which the 3D scene is virtually sliced, are realised and added in the observer window in order to achieve this. The transformations correspond with the optical propagation of light between the sliced object planes and the observer plane comprising the observer window. This method has the effect that each object point is assigned with a confined localised section on a screen, to which the information for the reconstruction of this point is written. This is necessary to allow a correct reconstruction from the observer window.

Encoding multiple sub-holograms, which are computed from the 3D scene next to each other and/or below each other on the screen, as suggested in the prior art, would have the effect that the hologram values which correspond to an object point are repeated in different sections on the screen. This is not possible though in conjunction with the principle of making visible the reconstructed 3D scene from the observer window. It is a general disadvantage of a spatial repetition of subholograms that the resolution of each individual sub-hologram is reduced in a given carrier medium.

SUMMARY OF THE INVENTION

An object of the present claimed invention is to significantly reduce the speckle patterns which occur when reconstructing a 3D scene in a holographic reproduction device with a virtual observer window, and to provide a near-real-time method where a carrier medium with a conventional refresh rate can be used.

The object can be generally solved by a method where multiple reconstructions of a 3D scene which are incoherent to each other are generated and superimposed at the same position in a reconstruction volume, instead of a single reconstruction generated with sufficiently coherent light. The individual, incoherent reconstructions contain different speckle patterns, because the incoherence goes along with a phase shift. The respective eye of the observer averages the speckle patterns from an eye position and sees only one single speckle-reduced reconstruction of the original 3D scene in a reconstruction volume.

A method comprising the inventive process steps according to the claims is performed in the holographic reproduction device such that Multiple independent light distributions which are incoherent to each other of complex-valued wave fronts of the same 3D scene are generated in an eye position in an observer region by the light of the 3D scene which is encoded on the light modulator, said light being controlled by the control means, and Multiple reconstructions of the 3D scene which correspond to the multiple light distributions of the complex-valued wave fronts are generated at the same position in a reconstruction volume and are superimposed incoherent to each other, such that one single speckle-reduced reconstruction of the 3D scene is seen from the eye position.

The method of the claimed invention can be applied separately for a right and a left eye of an observer, e.g. temporally one after another. Further, for generating a colour reconstruction, the method can be applied separately for the individual primary colours, i.e. red, green and blue, e.g. temporally one after another.

The virtual observer window of the claimed invention is based on for reconstructing the 3D scene here is identical with the plane in the observer region where the multiple independent light distributions which are incoherent to each other of the complex valued wave fronts of the encoded 3D scene form multiple independent sub-observer windows which are incoherent to each other. The eyes of an observer must be situated in an eye position in this plane in order to be able to see the reconstructed 3D scene. In the further description, both terms, eye position and observer window, will be used.

In this document, a complex-valued wave front shall be construed to be a wave front which is mathematically described by complex numbers which define the phase and amplitude of the wave front.

In order to preferably use the observer window, which typically comprises the complex-valued wave front of the reconstructed 3D scene, for generating multiple reconstructions which are incoherent to each other at the same position, multiple regions which are incoherent to each other must also be generated in the observer window. According to the present invention, this can be achieved by two different methods and corresponding reconstruction means.

According to features of the claimed invention, the following further process steps can be performed in order to generate the sub-observer windows which are incoherent to each other, according to a first embodiment:
  The complex-valued wave front which corresponds to the 3D scene is directly encoded in a respective region on the light modulator for each sub-observer window,
  The independent light modulator regions are illuminated incoherently to each other by illumination means, and
  The light modulator regions which are illuminated incoherently to each other are imaged by the reconstruction means into different sub-observer windows which are incoherent to each other in the observer window.

According to additional features of the claimed invention, the following further process steps can be performed in order to generate the sub-observer windows which are incoherent to each other, according to a second embodiment:
  The complex-valued wave fronts which correspond to the 3D scene are computed for each sub-observer window as an equivalent to an incoherent illumination; the incoherently computed, aggregated wave fronts are transformed on to the light modulator and encoded as a common hologram there,
  The light modulator is illuminated by an illumination means with sufficiently coherent light, and The common hologram is back-transformed into the multiple sub-observer windows which are incoherent to each other by the reconstruction means.

Multiple reconstructions which are incoherent to each other can thus not be generated by projecting the light distributions, but by transforming the incoherently computed light distributions of the sub-observer windows on to the light modulator, on which the transformed values are encoded as a common hologram. Fewer components are needed for illumination and reconstruction in a device for implementing the second method. A single illumination means and a two-piece reconstruction means with an optical reconstruction system and a screen already suffice for implementing the method.

The light distributions of the complex-valued wave fronts of the 3D scene are preferably computed incoherently in the individual sub-observer windows with different object phases, but with fix amplitude.

Thanks to the claimed features, it is achieved that each sub-observer window which is generated comprises a light distribution of the same complex-valued wave front of the 3D scene, all of which being incoherent among one another. Reconstructions which are incoherent to each other and which thus contain different speckle patterns are generated from complex-valued wave fronts which are incoherent to each other, so that the respective eye of an observer can average the speckle patterns of the generated reconstructions of the 3D scene.

For realising the claimed method, it is essential that at least two illumination means, which emit coherent light, illuminate at least two light modulator regions incoherently to each other in order to obtain an averaged speckle-reduced reconstruction. The more sub-observer windows which are incoherent to each other are generated in the observer window, the more the speckle pattern of the reconstruction of the 3D scene is preferably reduced.

In an embodiment of the method for reducing speckle for a transmissive direct-view display, the three-dimensional scene is divided into object points, and mutually incoherent sub-observer windows are generated for these object points. The process steps of the method are characterised in that The complex-valued wave front which corresponds to the 3D scene is computed for the common observer window, transformed onto the light modulator, and encoded as a common hologram, and A matrix arrangement of illumination means in combination with a matrix arrangement of reconstruction means illuminates different sub-hologram regions in a corresponding light modulator region of the light modulator in a mutually incoherent manner, where each light modulator region contains a subhologram of an object point, so that multiple sub-observer windows, which are smaller than the eye pupil, are generated in the observer window for each reconstructed object point by way of projections of the illuminated sub-hologram regions through the object point.

This method is further characterised in that the size of the mutually incoherently illuminated sub-hologram regions is defined by adapting the dimensions of the reconstruction means to the number of illumination means, each of which emitting sufficiently coherent light, but being incoherent among one another.

In contrast to an earlier-disclosed embodiment, where a common division of the observer window is created for the entire reconstructed three-dimensional scene, an observer window is here created for speckle reduction in which the position of the incoherent sub-observer windows can be different for each object point.

This embodiment is best suited for an implementation in a direct-view display, because of the typical dimensions of the light sources or illumination means and the reconstruction means. However, it may in principle also be used in a projection-type display.

The present claimed invention is further based on a holographic reproduction device which comprises at least one reconstruction means, sufficiently coherent illumination means, one controllable light modulator on which the 3D scene is encoded and one control means for controlling the illumination.

According to a preferred embodiment, the reconstruction means comprises a multipiece lens system and an optical imaging element, which also serves as a screen.

If the screen is of a reflective type, the light distributions of the complex-valued wave front are imaged into the observer window in front of the screen, such that all reconstructions are generated in a reconstruction volume in front of the observer window and become visible both in front of and behind the screen. If a further embodiment of the holographic reproduction device comprises a screen of a transmissive type, the light distributions of the complex-valued wave front are imaged into the observer window behind the screen, seen in the direction of light propagation, so that all reconstructions are generated in front of the observer window and become visible in a reconstruction volume both in front of and behind the screen.

Further, a holographic reproduction device for reducing speckle is provided to realise a further embodiment of the method aspect of this invention, said holographic reproduction device comprising the following means:

Multiple illumination means which emit sufficiently coherent light, but which are incoherent to each other, for illuminating multiple independent light modulator regions, and for generating multiple independent sub-observer windows in conjunction with a reconstruction means, An encoding means in the form of a light modulator, on to regions of which complex-valued wave fronts of a 3D scene are encoded, A reconstruction means for generating multiple independent sub-observer windows with light distributions which are incoherent to each other of the respective complex-valued wave front of individual light modulator regions in an observer window of an observer region, and for generating multiple reconstructions which are incoherent to each other from multiple independent light modulator regions which are illuminated incoherently to each other in a reconstruction volume, and A control means for controlling the illumination means, the encoding means and the reconstruction means.

Lasers are preferably used as illumination means in the various embodiments of the present invention.

A further characterising feature of this invention is that the independent sub-observer windows which are incoherent to each other are arranged next to each other in one dimension. A resulting overall lateral extent of the sub-observer windows has at least the given horizontal width b of the observer window intended for one eye.

The observer window for implementing the method according to the present invention for a left or right eye of an observer preferably comprises at least two sub-observer windows.

According to another embodiment, the independent sub-observer windows which are incoherent to each other are vertically arranged next to each other in one dimension and have an overall vertical extent which is at least the given height of an observer window intended for one eye.

The lateral and vertical overall extent of the sub-observer windows is preferably based on the diameter of an eye pupil of the eye. The spatial resolution of the reconstruction is limited by the resolution of the eye, the observer window can be larger than the eye pupil, and the observer still sees the reconstruction. However, a sub-observer window must always be smaller than an eye pupil, so that all subobserver windows can be seen simultaneously because the spatial resolution of the reconstruction is limited by the size of the observer window.

Another preferred form of the independent sub-observer windows which are incoherent to each other is that they are arranged in two dimensions in the observer window. They are disposed next to each other in horizontal and vertical direction and represent a square or rectangular area. The disturbing speckle patterns can preferably be continuously reduced in the holographic reproduction device by an increasing number of sub-observer windows and reconstructions which are incoherent to each other.

In order to image a light modulator region on to the screen in one dimension as uncomplicatedly as possible, a lens of a multi-piece lens system is provided, where the lens system is preferably represented by a lenticular with lenticules which are arranged in parallel. The multi-piece lens system is preferably formed as a matrix lens array for imaging the multiple light modulator regions in two dimensions.

A holographic reproduction device for reducing speckle patterns is for example a holographic display. By way of adequately designing the individual display components, in particular the optical components, the display can be realised either as a projection display or as a direct-view display. A projection display which is preferably formed according to method claim 3 requires a reconstruction means for transforming and reconstructing, said reconstruction means comprising only one optical reconstruction system and one optical projection element which also serves as a screen.

A further advantage of the present invention is that the hologram must only be encoded once, in contrast to the prior art, and that it does not have to be recomputed several times which results in a reduction of computing time.

BRIEF DESCRIPTION OF THE DRAWINGS

Now, a method according to this invention and corresponding holographic reproduction devices for implementing that method will be described in detail, in conjunction with the accompanying drawings, wherein.

Like numerals denote like components in the individual Figures and accompanying description.

DETAILED DESCRIPTION

Figure 1:
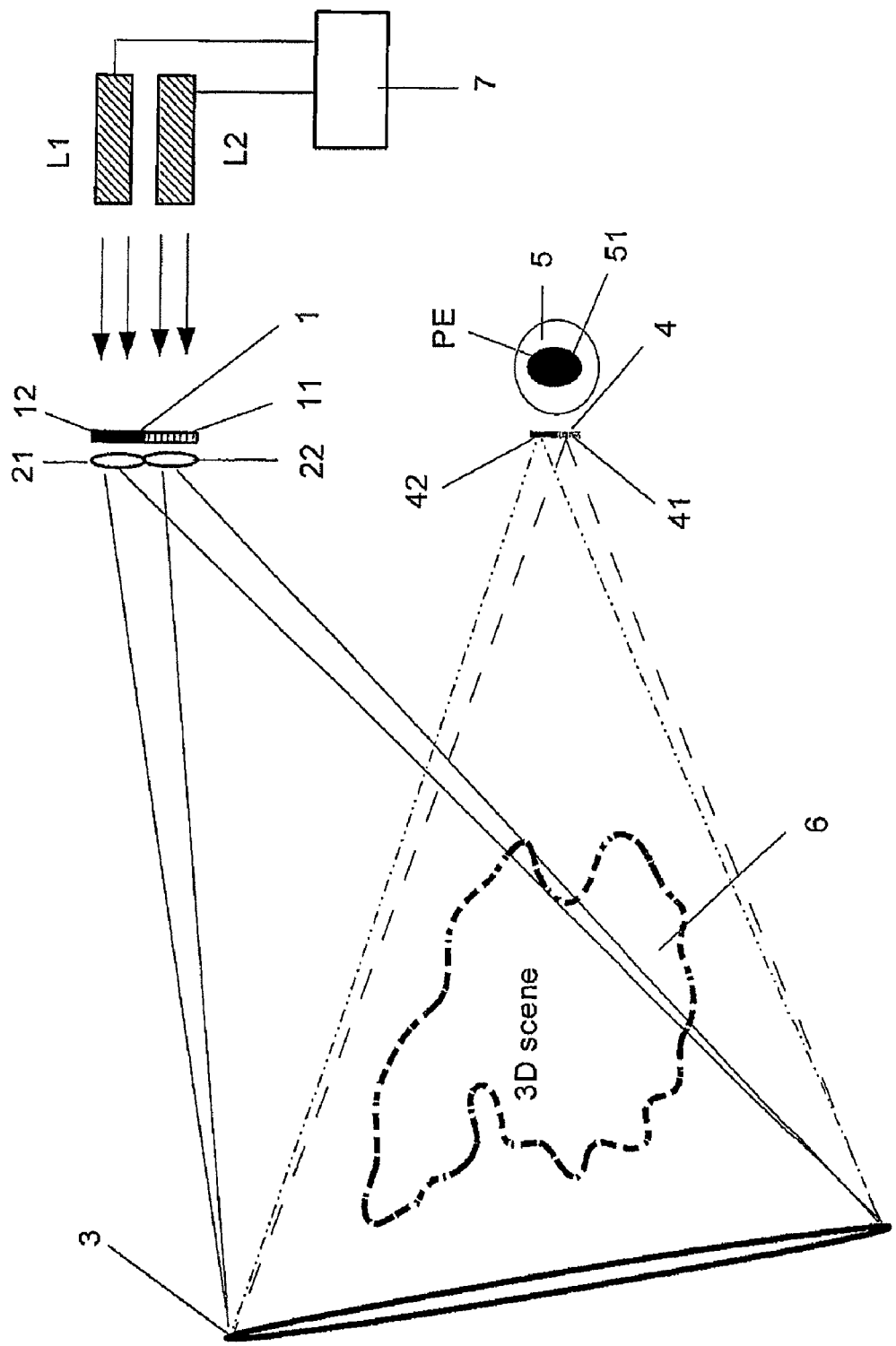
FIG. 1 shows a schematic top view of a reflection-type holographic projection display according to a first embodiment.

FIG. 1 is a schematic and simplified top view showing a first embodiment of a holographic projection display. The following components are disposed one after another, seen in the direction of light propagation:

Illumination means in the form of two lasers L1; L2 which illuminate two light modulator regions 11;12 in a light modulator 1, and A reconstruction means which preferably comprises a two-piece lens system 21; 22 and an optical imaging element 3 which also serves as a screen.

An eye pupil 51 of an eye 5 is situated in an eye position PE near a virtual observer window 4, which includes two independent sub-observer windows 41; 42 which are incoherent to each other. A reconstruction 6 of a 3D scene is seen in a reconstruction volume which stretches between the screen and the eye position PE. A control means 7 controls the illumination and the components which are touched by the light.

Figure 2:
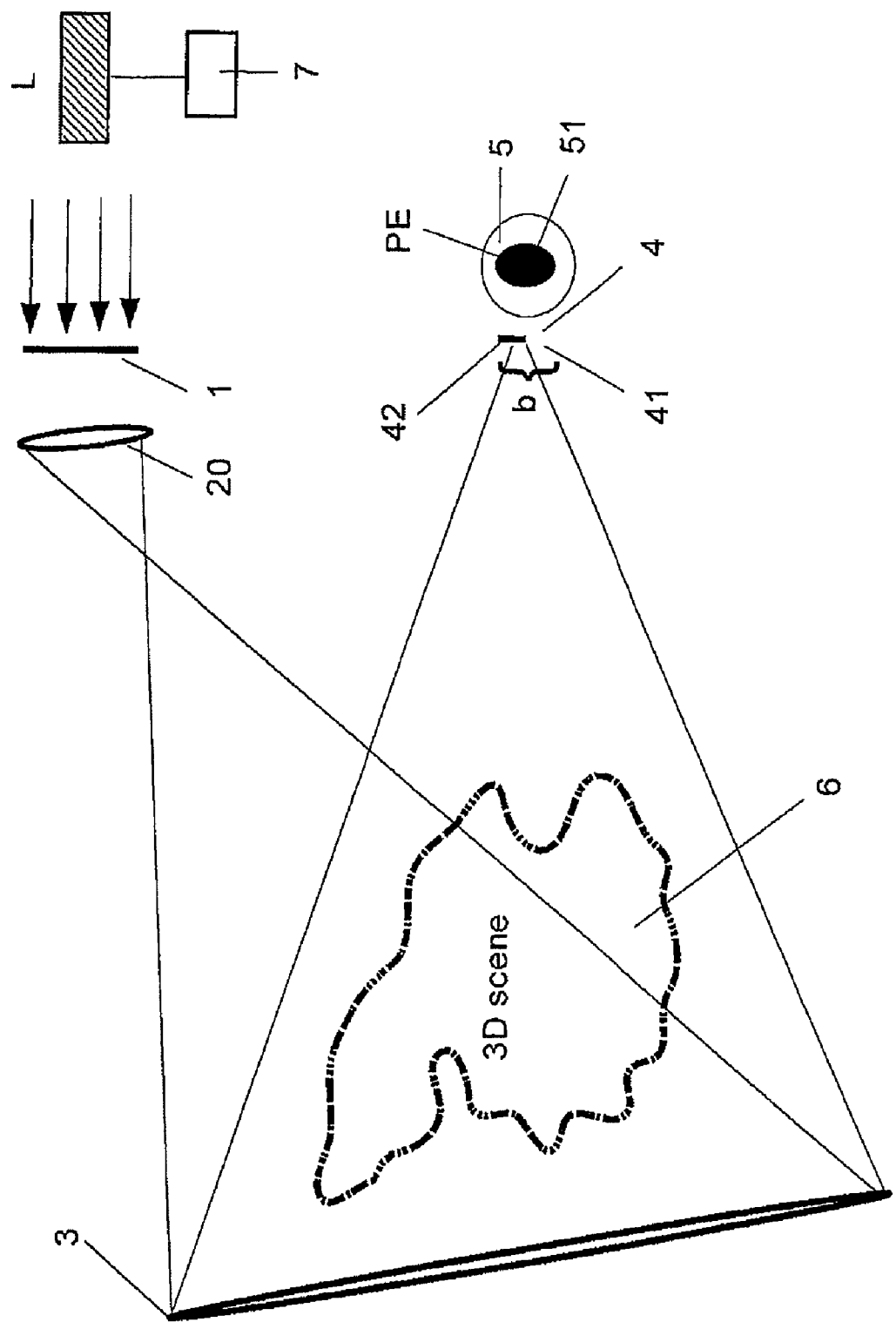
FIG. 2 shows a schematic top view of a reflection-type holographic projection display according to a second embodiment.

FIG. 2 is a schematic and simplified top view showing a second embodiment of a holographic projection display. The following components are disposed one after another, seen in the direction of light propagation:

An illumination means in the form of a laser L, which illuminates a light modulator 1 on which a hologram is encoded, and A reconstruction means which comprises an optical reconstruction system 20 and an optical imaging element 3 for transforming the light which comes from the light modulator, and for reconstructing a 3D scene, where the optical imaging element 3 also serves as a screen.

The light of the laser L generates an observer window 4 in an eye position PE near the eye 5, said observer window 4 comprising two independent sub-observer windows 41; 42 which are incoherent to each other, and having a given horizontal width b. The reconstruction 6 of a 3D scene is seen from here. The illumination is controlled by a control means 7.

Figure 3A:
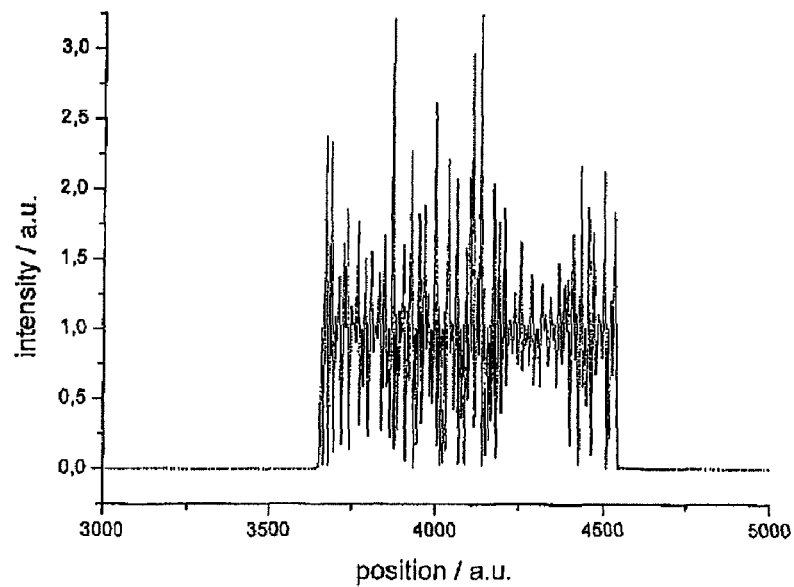
FIGS. 3a, 3b show diagrams with simulation results for a speckle pattern after the reconstruction of a two-dimensional object with coherent (3a) and incoherent (3b) illumination.
Figure 3B:
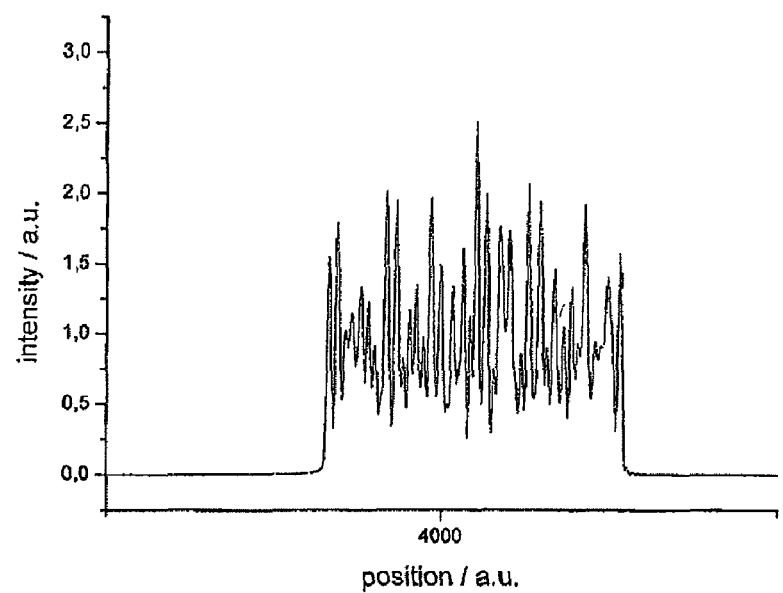

FIGS. 3a and 3b show the results of holographic simulations in the form of diagrams which illustrate the speckle pattern of a reconstruction of a rectangular object with coherent (3a) and incoherent (3b) illumination at a given position.

The intensity of a speckle pattern in relation to an observer position is shown with arbitrary units in the diagrams. It can be seen in FIG. 3b that generating two reconstructions which are incoherent to each other of the same 3D scene and superimposing them at the same position in the reconstruction volume makes the intensity of the speckle pattern much lower for an eye 5, compared with FIG. 3a.

Figure 4:
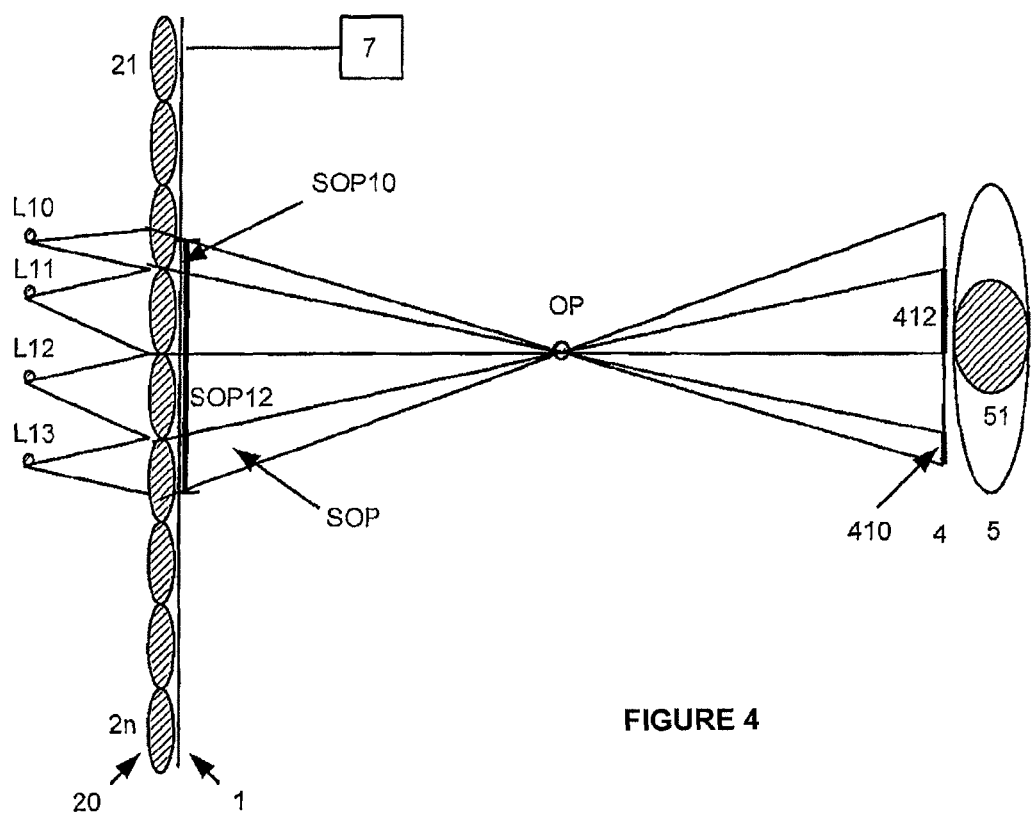
FIG. 4 shows a schematic top view of an embodiment of a transmission-type holographic direct-view display.

FIG. 4 shows a schematic top view of an embodiment of a transmission-type holographic direct-view display. Illumination means L10 to L13 of an illumination matrix and a reconstruction means with lenses 21 to 2n are disposed in front of a light modulator 1, seen in the direction of light propagation. A sub-hologram SOP of a reconstructed object point OP is encoded in a light modulator region. The drawing further shows the geometric beam paths of the mutually incoherently illuminated subhologram regions SOP10 to SOP13 through the object point OP to the common observer window 4, and the sub-observer windows 412 and 410 are indicated in the observer window 4. An eye 5 of an observer with the eye pupil 51 lies directly behind the observer window 4. A control means 7 controls the illumination and the components for the reconstruction of the three-dimensional scene which are touched by the light.

The method according to this invention will now be explained in more detail with the help of embodiments.

According to the present claimed invention, different sub-observer windows 41 to 4n which are incoherent to each other, i.e. at least two sub-observer windows 41; 42, are essential for reducing speckle in the observer window 4, so that a respective number of regions which are illuminated incoherently to each other must also be created on the light modulator 1. FIG. 1 shows schematically a suitable holographic reproduction device in the form of a reflection-type projection display for implementing such a method.

Each laser L1; L2 separately illuminates a light modulator region 11; 12 of the light modulator 1 with coherent light, so that there is coherent illumination within individual regions, but incoherent illumination among them. The complex-valued wave front of the 3D scene here is directly encoded on the independent light modulator regions 11; 12 of the light modulator 1.

Each light modulator region 11; 12 is separately imaged in an enlarged manner by a lens 21; 22 of a multi-piece lens system on to the optical imaging element 3, and from there it is imaged in a diminished manner into two regions of the observer window 4 of like size which are arranged next to each other. Those regions are defined as sub-observer windows 41; 42. The observer window 4 thus comprises next to each other two light distributions which are incoherent to each other of the complex-valued wave front of the same 3D scene in two sub-observer windows 41; 42. The two optical projection paths are indicated in different line types starting at the screen.

The control means 7 controls the laser and the light modulator 1 such that from the two complex-valued wave fronts in the observer window 4 two reconstructions which are incoherent to each other of the 3D scene with different speckle patterns are generated and superimposed at the same position in the reconstruction volume between the optical imaging element 3 and the observer window 4. The right or the left eye 5 of the observer sees with its eye pupil 51 in the observer window 4 a single reconstruction 6, as a superimposition of the incoherent reconstructions, with reduced speckle pattern. The superimposition is illustrated in the representation of 3D scene as a combination of the different line types which represent the optical 5 paths.

The light modulator 1 can be encoded variably such that the reconstruction 6 of the 3D scene is visible in front of and/or behind the screen. The screen can for example be an imaging lens with reflective rear surface. Both features also apply to FIG. 2.

The overall lateral extent of the sub-observer windows 41; 42 which are arranged next to each other in one dimension corresponds to the given horizontal width b (only shown in FIG. 2) of the observer window 4. The diameter of the eye pupil 51 of the respective observer eye is a measure for the horizontal or vertical width or height of the observer window 4, which must be defined. The individual sub-observer windows 41; 42 here are preferably smaller than the eye pupil 51.

If the sub-observer windows 41; 42 are larger than the eye pupil 51, there will be several positions within the observer window 4 where the eye pupil 51 is entirely situated within one sub-observer window 41; 42, so that the speckle patterns are not reduced, and there will be other positions where the eye pupil 51 covers parts of different sub-observer windows, so that speckle patterns continue to be reduced.

FIG. 2 is a schematic and simplified top view showing a second embodiment of a reflection-type holographic projection display. The following components are disposed one after another, seen in the direction of light propagation:

An illumination means in the form of a laser L, which coherently illuminates a light modulator 1, and A reconstruction means which comprises an optical reconstruction system 20 and an optical imaging element 3 which also serves as a screen.

A virtual observer window 4 with a given horizontal width b is situated in an eye position PE near an eye 5, said virtual observer window 4 comprising two independent sub-observer windows 41; 42. A reconstruction 6 of a 3D scene is seen in a reconstruction volume. In contrast to FIG. 1, no complex-valued wave fronts of the same 3D scene are imaged here, but a hologram of the 3D scene is computed once for multiple, preferably two, independent regions or sub-observer windows 41; 42 of the observer window 4 as if the complex-valued wave fronts were illuminated incoherently to each other in those regions, which are arranged side by side. This is achieved by giving those regions a phase shift when computing the wave fronts, for example by using different object phases or random phases. A random phase allows to evenly distributing the light intensity or the information of the 3D scene in the entire observer window 4.

Referring to FIG. 2, the computed wave fronts which are incoherent to each other are transformed as a common hologram from the sub-observer windows 41; 42 on to the light modulator 1, where they are encoded as a common hologram. By illuminating the light modulator 1 with the help of the laser L, the encoded complex-valued wave front of the common hologram is back-transformed by the optical reconstruction system 20 and the optical imaging element 3 into the two independent sub-observer windows 41; 42 of the observer window 4 which are incoherent to each other. The distance of the optical reconstruction system 20 to the optical imaging element 3 is chosen such that the back-transform is enlarged on the screen, and the reconstruction 6 is also projected in an enlarged manner. The back-transform is diminished from the screen into the observer window 4 near the eye pupil 51 according to the principle of the observer window projection. As described for FIG. 1, two superimposed reconstructions, which are visible for the observer as one single reconstruction 6 with reduced speckle pattern, are generated from the two backtransformed complex-valued wave fronts of the sub-observer windows 41; 42.

The Fourier transformation is preferably used in this method because it can be implemented in programmes easily and can be realised very precisely by optical systems. A light modulator with conventional refresh rate can be used for this method, and the hologram computation should preferably only be realised at this frequency.

The method for reducing speckle patterns according to this invention, which is based on averaging speckle-carrying, mutually incoherent sub-observer windows in a common observer window, can also be used in transmission-type direct-view displays according to FIG. 4. For this, the three-dimensional scene must be divided into individual object points, and each object point must be encoded as a subhologram in a light modulator region of a light modulator.

The light emitted by a matrix arrangement of illumination means, of which four light sources L10 to L13 are shown in the drawing, is directed by a reconstruction means 20 at a light modulator 1, a light modulator region of which containing the encoded sub-hologram SOP of a selected object point OP. Each illumination means L10 to L13 emits sufficiently coherent light, but the illumination means are mutually incoherent.

The reconstruction means 20 is a matrix arrangement of lenses 21 to 2n, which have a focussing function here. The lenses can for example be provided in the form of a two-dimensional arrangement of spherical lenses, or a one-dimensional arrangement of cylindrical lenses of a lenticular.

In FIG. 4, a lenticular with a selected lens pitch is used. Because of the lens pitch and the size and position of the sub-hologram SOP on the light modulator 1, the subhologram SOP here extends across a region of four adjacent lenses of the reconstruction means 20. One light source means L10 to L13 illuminates through a lens one sub-hologram region SOP10 to SOP13 of the sub-hologram SOP. The projections of each illuminated sub-hologram region SOP10 to SOP13 through the object point OP generate in the observer window 4 according sub-observer windows, of which the sub-observer windows 412 and 410 are shown in the drawing.

The entire observer window 4 is larger than the eye pupil 51. Each of the generated sub-observer windows is always smaller than the eye pupil 51, which must cover at least two sub-observer windows to be able to average the speckle patterns. Consequently, the eye here averages the superposition of two mutually incoherent reconstructions of the three-dimensional scene with speckle patterns.

For other object points OPn with different lateral positions, but with the same depth as the object point OP, multiple incoherent sub-observer windows are also generated in the observer window 4, where the positions of those other multiple incoherent subobserver windows are laterally displaced. The eye also perceives the superpositions of multiple incoherent reconstructions of those object points. By superimposing the incoherent reconstructions of all object points which are averaged by the eye, the speckle patterns of the entire three-dimensional scene will be reduced. A control means 7 controls the modulation and reconstruction of the three-dimensional scene.

If the lenses used are small enough, this embodiment can also be implemented in a projection-type display.

The relative position of the sub-holograms with respect to the individual lenses of the reconstruction means is important for the reconstruction of the three-dimensional scene in the common observer window. If a sub-hologram extends for example across two lenses, two incoherent sub-observer windows will be generated at a lateral offset in the common observer window in order to reconstruct the single object point. Due to the effects of diffraction, these two sub-observer windows are not fully separated, but are partly overlapped. The overlapping is not disadvantageous though, but rather has a positive effect on the speckle reduction.

The smaller the individual lenses, the smaller are the mutually incoherent subobserver windows. If the lenses are so small compared with the size of the subhologram and that of the observer window that multiple mutually incoherent sub-observer windows fall in the eye pupil, then it will preferably be possible for the eye to average multiple mutually incoherent reconstructions, thus reducing the speckle patterns.

The ratio of lens size to the size of the sub-observer windows depends on several parameters, such as the pixel pitch of the light modulator, the distance between screen and observer, the wavelength of the light, and on the depth coordinate of the object point itself. Based on these parameters, the lens size can be chosen such that the condition—incoherent sub-observer windows smaller than the eye pupil—is fulfilled for a given depth range of the three-dimensional scene.

The individual object points of the three-dimensional scene are encoded on the light modulator in the individual light modulator regions irrespective of whether an analytical computation is performed or a computation involving Fourier and Fresnel transformations.

Referring to FIG. 1 and FIG. 2, the eye position information of the observer eye 5 is typically detected by a position detection system (not shown) in at least two dimensions and processed by the control means 7. Details shall be omitted here. With the help of this information, the control means 7 controls the illumination and the operation of the light modulator 1 and reconstruction means for implementing the method according to the present invention.

In order to facilitate the imaging or transformation, adequate correction means, whose functions are controlled by the control means, can of course be provided in the optical light path. The method according to the present invention, has a major advantage: the number of sub-observer windows with regions which are incoherent to each other of complex-valued wave fronts and the correspondingly large number of reconstructions of the 3D scene can be freely increased without the need of any additional components in order to achieve a further reduction of the occurring speckle patterns.

The inventive method for reducing speckle in a reconstruction of a three-dimensional scene as described above can be implemented both in a holographic projection display and in a holographic direct-view display, if the components are modified accordingly.

REFERENCE NUMERALS

1 Light modulator
11; 12 . . . ; 1n Light modulator regions
20 Optical reconstruction system
21; 22 . . . ; 2n Lenses of a lens system
3 Optical imaging element
4 Observer window
41; 42 . . . ; 4n Sub-observer window
5 Observer eye
51 Eye pupil
6 Reconstruction
7 Control means
L, L1 . . . ; Ln Illumination means
b Horizontal width of the observer window
OP Object point
PE Eye position
SOP Sub-hologram of the object point
SOP1; . . . ; SOPn Sub-hologram region

The invention claimed is:

1. Method for reducing speckle in a three-dimensional holographic reconstruction which is created in a holographic display device with a controllable light modulator on which a 3D scene is encoded and which is illuminated with sufficiently coherent light, comprising:
generating, near an eye position of an observer eye a defined virtual observer window, where:
the observer window is located in an image plane of a light source; and
the observer window comprises only one diffraction order of a periodical reconstruction; and
forming in the virtual observer window, using independent, mutually incoherent light distributions, independent, mutually incoherent sub-observer windows by controlling the illumination of said controllable light;
wherein:
complex-valued wave fronts of the same 3D scene jointly generate the independent, mutually incoherent light distributions in the observer window, so that a common division of the observer window into independent, mutually incoherent sub-observer windows is created for the entire 3D scene to be reconstructed, and that the reconstructions of the 3D scene are superposed in a reconstruction space in the same place in a mutually incoherent way, so that a single speckle-reduced reconstruction of the 3D scene is seen from the eye position.

2. Method for reducing speckle according to claim 1, where at least two independent, mutually incoherent sub-observer windows are jointly generated for the 3D scene in that the complex-valued wave front of the 3D scene is directly encoded on at least two independent light modulator regions, the independent light modulator regions are illuminated in a mutually incoherent way by illumination means, and the light modulator regions which are illuminated in a mutually incoherent way are imaged by reconstruction means into the at least two independent, mutually incoherent sub-observer windows which are situated next to each other.

3. Method for reducing speckle according to claim 2, where the reconstruction means comprises an optical imaging element which also serves as a screen.

4. Method for reducing speckle according to claim 3, where the screen is of a reflective type, and where the light distributions of the complex-valued wave front are transformed into the observer window in front of the screen, so that all reconstructions are created in a reconstruction space in front of the observer window and become visible both in front of and behind the screen.

5. Method for reducing speckle according to claim 3, where the screen is of a transmissive type, and where the light distributions of the complex-valued wave front are transformed into the observer window behind the screen, seen in the direction of light propagation, so that all reconstructions are created in a reconstruction space in front of the observer window and become visible both in front of and behind the screen.

6. Holographic display device for reducing speckle according to the method according to claim 2, wherein the following means are provided one after another, seen in the direction of light propagation:

at least two illumination means which emit sufficiently coherent, but mutually incoherent light, for illuminating at least two independent light modulator regions, an encoding means in the form of a light modulator, on which the 3D scene is encoded several times in the form of complex-valued wave fronts in independent regions, a reconstruction means for imaging the independent light modulator regions into at least two independent, mutually incoherent sub-observer windows which are situated next to each other, with mutually incoherent light distributions of the respective complex-valued wave front of the 3D scene in an observer window of an observer space, in order to get for the entire 3D scene to be reconstructed a common division of the observer window into independent, mutually incoherent sub-observer windows, and a control means for controlling the illumination means, the encoding means and the reconstruction means.

7. Holographic display device according to claim 6, where the reconstruction means comprises a multi-piece lens system, and where each lens of the lens system is a lenticule of a lenticular for the one-dimensional imaging of a light modulator region.

8. Holographic display device according to claim 6, where the reconstruction means comprises a multi-piece lens system which is formed as a matrix lens array for the two-dimensional imaging of the multiple light modulator regions.

9. Holographic display device according to claim 6, where the independent, mutually incoherent sub-observer windows are horizontally arranged next to each other in one dimension and have an overall lateral extent which is at least the given horizontal width of the observer window which is intended for one eye.

10. Holographic display device according to claim 9, where the overall lateral and vertical extent of the sub-observer windows is determined by the diameter of an eye pupil of the eye.

11. Holographic display device according to claim 6, where the independent, mutually incoherent sub-observer windows are vertically arranged next to each other in one dimension and have an overall vertical extent which is at least the given vertical height of the observer window which is intended for one eye.

12. Holographic display device according to claim 11, where the overall lateral and vertical extent of the sub-observer windows is determined by the diameter of an eye pupil of the eye.

13. Holographic display device according to claim 6, where the independent, mutually incoherent sub-observer windows are arranged in two dimensions in the observer window.

14. Holographic display device according to claim 6, where the optical components are adapted either to a direct-view display or to a projection display.

15. Method for reducing speckle according to claim 1, where at least two independent, mutually incoherent sub-observer windows are jointly generated for the 3D scene in that the complex-valued wave front which corresponds to the 3D scene is computed as an equivalent to an incoherent illumination in the observer window for at least two sub-observer windows, the incoherently computed complex-valued wave fronts are transformed onto the light modulator and encoded as a joint hologram, an illumination means illuminates the light modulator with sufficiently coherent light, and a reconstruction means back-transforms the hologram into at least two mutually incoherent sub-observer windows which have the same size and are situated next to each other.

16. Method for reducing speckle according to claim 15, where the wave fronts in the at least two sub-observer windows are incoherently computed with different object phases.

17. Holographic display device according to claim 16, where a single sub-observer window is always smaller than the eye pupil.

18. Method for reducing speckle in a three-dimensional holographic reconstruction which is created in a holographic display device with a controllable light modulator on which a 3D scene is encoded and which is illuminated with sufficiently coherent light, comprising:

generating, near an eye position, a defined virtual observer window, where the virtual observer window is:

located in an image plane of a light source; and comprises only one diffraction order of a periodical reconstruction; and forming in the virtual observer window, using a control means to illuminate the controllable light modulator to form independent mutually incoherent light distributions, independent, mutually incoherent sub-observer windows, where the illumination of the controllable light modulator is controlled by a control means;

wherein complex-valued wave fronts of the same 3D scene jointly generate the independent, mutually incoherent light distributions in the observer window, so that:

a common division of the observer window into independent, mutually incoherent sub-observer windows is created for the entire 3D scene to be reconstructed, and;

reconstructions of the 3D scene are superposed in a reconstruction space in the same place in a mutually incoherent way, so that a single speckle-reduced reconstruction of the 3D scene is seen from the eye position, where:

at least two independent, mutually incoherent sub-observer windows are jointly generated for the 3D scene such that the complex-valued wave front of the 3D scene is directly encoded on at least two independent light modulator regions of the same light modulator;

the independent light modulator regions of the same light modulator are illuminated in a mutually incoherent way by illumination means; and the light modulator regions of the same light modulator which are illuminated in a mutually incoherent way are imaged by reconstruction means into the at least two independent, mutually incoherent sub-observer windows which are situated next to each other.

* * * * *